United States Patent
Dieumegard et al.

(10) Patent No.: US 12,125,391 B2
(45) Date of Patent: Oct. 22, 2024

(54) METHOD OF DETERMINING A TRAJECTORY FOR A ROTORCRAFT

(71) Applicant: AIRBUS HELICOPTERS, Marignane (FR)

(72) Inventors: Pierre Dieumegard, Aix en Provence (FR); Julien Caillet, Bouc Bel Air (FR); Frederic Guntzer, Gignac la Nerthe (FR)

(73) Assignee: AIRBUS HELICOPTERS, Marignane (FR)

( * ) Notice: Subject to any disclaimer, the term of this patent is extended or adjusted under 35 U.S.C. 154(b) by 209 days.

(21) Appl. No.: 17/865,797

(22) Filed: Jul. 15, 2022

(65) Prior Publication Data

US 2024/0021089 A1     Jan. 18, 2024

(51) Int. Cl.
*G08G 5/00*     (2006.01)
*G06N 5/01*     (2023.01)

(52) U.S. Cl.
CPC ............ *G08G 5/0034* (2013.01); *G06N 5/01* (2023.01); *G08G 5/0021* (2013.01); *G08G 5/0039* (2013.01); *G08G 5/006* (2013.01)

(58) Field of Classification Search
CPC .. G08G 5/0034; G08G 5/0021; G08G 5/0039; G08G 5/006; G08G 5/0013; G08G 5/0052; G08G 5/0069; G06N 5/01
See application file for complete search history.

(56) References Cited

U.S. PATENT DOCUMENTS

2019/0344901 A1* 11/2019 Darnell ............... G08G 5/0065
2021/0358310 A1* 11/2021 Sachs ..................... G08G 5/003

* cited by examiner

*Primary Examiner* — Alan D Hutchinson
(74) *Attorney, Agent, or Firm* — Brooks Kushman P.C.

(57) ABSTRACT

A method of determining a trajectory for a rotorcraft, comprising: receiving an initial trajectory defining a planned flight path of the rotorcraft between a starting point and a target point; performing iterations of a loop comprising adding the initial trajectory to a set of selectable trajectories, evaluating a noise indicator of the rotorcraft for the initial trajectory on the basis of a noise-related acoustic footprint and a noise exposure level-related acoustic footprint, adding the evaluated noise indicator to a set of evaluated noise indicators, determining an alternative trajectory defining an alternative flight path of the rotorcraft between the starting point and the target point on the basis of the evaluated noise indicator, and setting the alternative trajectory as initial trajectory; and outputting a trajectory of the set of selectable trajectories associated with a selected noise indicator fulfilling predetermined noise indicator conditions.

15 Claims, 6 Drawing Sheets

METHOD OF DETERMINING A TRAJECTORY FOR A ROTORCRAFT

The project leading to this application has received funding from the European Union's Horizon 2020 research and innovation program, under CleanSky 2 grant agreement No [GAM-FRC-2014-001 Issue E].

TECHNICAL FIELD

The present disclosure relates to a method of determining a trajectory for a rotorcraft. Furthermore, the present disclosure relates to a flight management system in a rotorcraft that is configured to implement a method of determining a trajectory for the rotorcraft. Moreover, the present disclosure relates to a computing system with at least one computing device and at least one processor, wherein the at least one computing device is configured to execute on the at least one processor a method of determining a trajectory for a rotorcraft.

BACKGROUND

Rotorcraft are frequently used for missions in sensitive and/or high densely populated areas. However, although recent developments in rotorcraft technology lead to reductions in noise emission in rotorcraft operation as required by respective reductions of certification noise levels, an overall noise annoyance due to rotorcraft operation continues to increase. This is partially due to an increase of the number of rotorcraft operating in such sensitive and/or high densely populated areas, but it is also due to the fact that rotorcrafts usually travel essentially identical trajectories impacting always the same population on ground.

In the state-of-the-art, numerous works tackle the problem of designing low-noise procedures for rotorcrafts. Most of the works focus on avoiding flight conditions in which Blade-Vortex Interaction (BVI) noise occurs, in particular during descents/approaches of rotorcrafts to respective landing points. Furthermore, stochastic optimization methods such as e.g., genetic algorithms are used to determine a noise-reduced trajectory for a given mission. These stochastic optimization methods lead to a non-negligible noise improvement but do not provide any guarantee of optimality. Furthermore, deterministic graph-based methods such as e.g., Dijkstra, A*, may also be used to determine a single noise-reduced trajectory for a given mission. Nevertheless, use of such deterministic graph-based methods is only possible under the assumption that noise is factorable which, however, is not the case.

In both cases, however, only one single noise-reduced trajectory is determined and this single noise-reduced trajectory is usually invariable in a given sensitive and/or high densely populated area. Consequently, in case of significant traffic in the given sensitive and/or high densely populated area always the same population will be impacted by rotorcraft operation.

In addition to determination of one single noise-reduced trajectory, complementary pilot assistance during rotorcraft operation may be provided, e.g., in the context of the so-called "Fly Neighborly" noise reduction program. Accordingly, a respectively evaluated noise footprint of the rotorcraft may be displayed to the pilot of a given rotorcraft in real time during rotorcraft operation. Display of the respectively evaluated noise footprint is, however, generally not accompanied by an indication to the pilot to perform an appropriate action to reduce the noise footprint. This lets the pilot free to choose but requires significant training for him to be able to know which noise levels might be annoying, and what to do in which case. In addition, pilots usually do not have any updated information on how to fly more quietly in rotorcraft operation on a given trajectory. When caring about noise, they usually refer to noise abatement guidelines that are present in respective flight manuals of rotorcrafts, if available.

SUMMARY

It is, therefore, an object of the present disclosure to provide a new method of determining a noise-reduced trajectory for a rotorcraft with locally minimized noise annoyance. It is a further object of the present disclosure to provide a flight management system in a rotorcraft that is suitable for implementation of the new method, as well as to provide a respective computer system.

The above-described object is solved by a method of determining a trajectory for a rotorcraft comprising the features of claim 1. More specifically, the method comprises: receiving an initial trajectory defining a planned flight path of the rotorcraft between a starting point and a target point; performing iterations of a loop comprising: adding the initial trajectory to a set of selectable trajectories, determining a noise-related acoustic footprint of the rotorcraft for the initial trajectory, determining a noise exposure level-related acoustic footprint of the rotorcraft for the initial trajectory, evaluating a noise indicator of the rotorcraft for the initial trajectory on the basis of the noise-related acoustic footprint and the noise exposure level-related acoustic footprint, adding the evaluated noise indicator to a set of evaluated noise indicators, determining an alternative trajectory defining an alternative flight path of the rotorcraft between the starting point and the target point on the basis of the determined noise indicator, and setting the alternative trajectory as initial trajectory; comparing all evaluated noise indicators in the set of evaluated noise indicators to determine a selected noise indicator that fulfills predetermined noise indicator conditions; and outputting a trajectory of the set of selectable trajectories that is associated with the selected noise indicator.

Advantageously, the inventive method represents a new computational method aiming at optimizing rotorcraft trajectories so as to minimize noise exposure of population on ground and to improve community acceptance of rotorcraft noise. In other words, the inventive method contributes to so-called "green" rotorcraft technologies and enables rotorcrafts to fly comparatively quiet in order to reduce noise exposure to population on the ground. More specifically, Low-Noise Procedures (LNP) are provided for rotorcrafts, which are potentially applicable to any kind of rotorcraft. These LNP rely on acoustic computations to perform environmental impact assessment of rotorcraft operations and mathematics, i.e., optimization, to optimize such operations.

The inventive method is advantageously applicable in future research programs focused on development of new Flight Management System (FMS) functionalities. It may also be used in a future Mission Management System in order to help pilots preparing a quietest possible mission. It may also be used in rotorcraft training means for suggesting techniques to pilots on how to fly quietly.

More particularly, operational rotorcraft noise is currently one of the main issues in development of future Urban Air Mobility (UAM). Therefore, there is a need to improve rotorcraft operations in order to reduce exposure of population on ground to rotorcraft noise. This is achieved by providing a new algorithmic scheme as a basis for the inventive method, which is able to provide a noise-reduced and, preferably, a noise-minimized rotorcraft trajectory with a guarantee of local optimality, i.e., with a locally minimized noise annoyance.

Advantageously, the new algorithmic scheme uses a new optimization criterion which considers an expected exposure of population on ground to rotorcraft noise and a respective local background noise, which is frequently also referred to as ambient noise. Hence, the inventive method does not just focus on reducing an overall noise emission of a given rotorcraft, but considers in addition community, i.e., population, noise exposure in the optimization process.

Furthermore, the inventive method preferably considers a noise exposure history in determination of a noise-reduced trajectory and, thus, considers a respective noise exposure of the population on ground to previous rotorcraft operations. This is particularly advantageous in case of huge rotorcraft traffic to divide e.g., rotorcraft operations in a given sensitive and/or high densely populated area into multiple distinct trajectories to reduce noise annoyance in specific parts of the given sensitive and/or high densely populated area, i.e., to distribute or spread noise annoyance more widely over the given sensitive and/or high densely populated area.

Preferably, the inventive method enables provision of real-time information to a pilot of a rotorcraft in order to inform the pilot on when to switch from a given rotorcraft trajectory to an alternative rotorcraft trajectory, based on the evaluation of the noise indicator of the rotorcraft. Furthermore, the pilot may advantageously be informed in real-time on when to activate a Selectable Noise Reduction System (SNRS) based on the evaluation of the noise indicator of the rotorcraft. Such SNRS can be coupled to an Automatic Flight Control System (AFCS) to perform automatic actions for reducing noise emission of the rotorcraft. This reduces the pilot's workload for reducing the noise indicator of the rotorcraft.

In summary, the inventive method enables a reduction of population exposure to rotorcraft noise through determination of noise-reduced and, preferably, noise-minimized rotorcraft trajectories, with a guarantee of local optimality. In addition to the determination of such noise-reduced, i.e., noise-minimized rotorcraft trajectories, a rotorcraft pilot may be informed that SNRS activation may be advisable, based on evaluation of the noise indicator of the rotorcraft in real-time.

According to some aspects, at least two iterations of the loop are performed.

According to some aspects, receiving an initial trajectory defining a planned flight path of the rotorcraft between a starting point and a target point comprises using a path planning algorithm, in particular a Fast Marching Tree, to compute the initial trajectory using the starting point and the target point.

According to some aspects, determining a noise-related acoustic footprint of the rotorcraft for the initial trajectory comprises computing a noise metric defining rotorcraft noise emergence above background noise.

According to some aspects, computing a noise metric defining rotorcraft noise emergence above background noise comprises selecting a minimum value of interest $L_{min}$ for the noise metric, selecting a maximum value of interest $L_{max}$ for the noise metric, and determining a predetermined number m of intervals of values of interest according to:

$$\forall k \in \{1, \ldots, m\}, \underline{L_k} \leq \overline{L_k}$$

$$\forall k \in \{1, \ldots, m-1\}, \overline{L_k} = \underline{L_{k+1}}$$

$$\underline{L_1} = L_{min}, \overline{L_m} = L_{max}.$$

According to some aspects, determining a noise exposure level-related acoustic footprint of the rotorcraft for the initial trajectory comprises computing population exposure to rotorcraft noise on the initial trajectory.

According to some aspects, computing population exposure to rotorcraft noise on the initial trajectory comprises determining a plurality of waypoints on the initial trajectory, determining a number of people forming the population on the plurality of waypoints, determining the noise-related acoustic footprint of the rotorcraft at the plurality of waypoints, and computing an associated noise exposure for the plurality of waypoints that relates at the plurality of waypoints the noise-related acoustic footprint of the rotorcraft to the number of people forming the population.

According to some aspects, determining a noise exposure level-related acoustic footprint of the rotorcraft for the initial trajectory comprises counting a number of people pk subjected to rotorcraft noise in each interval k of the predetermined number m of intervals of values of interest, and evaluating a noise indicator of the rotorcraft for the initial trajectory on the basis of the noise-related acoustic footprint and the noise exposure level-related acoustic footprint comprises determining a noise indicator f for an associated noise exposure in each interval of values of interest of the predetermined number m of intervals of values of interest according to:

$$f = \sum_{k=1}^{m} \alpha_k * p_k$$

$$\forall k \in \{1, \ldots, m-1\}, \alpha_k < \alpha_{k+1},$$

wherein $\alpha_k$ is an applied weighting factor forming a noise annoyance factor associated with each interval k of the predetermined number m of intervals of values of interest.

According to some aspects, determining a noise exposure level-related acoustic footprint of the rotorcraft comprises determining a number of previous flights during a predetermined time interval, and weighing the noise exposure level-related acoustic footprint on the basis of a cumulated noise exposure level-related acoustic footprint of the determined number of previous flights.

According to some aspects, the starting point indicates a current position of the rotorcraft.

According to some aspects, the method is repeatedly performed in flight operation of the rotorcraft to adjust the initial trajectory.

According to some aspects, the method further comprises displaying at least the outputted trajectory on a display device in the rotorcraft to the pilot.

According to some aspects, the method further comprises displaying an indicator representing a current noise indicator on a display device in the rotorcraft to the pilot.

The above-described object is further solved by a flight management system in a rotorcraft that is configured to implement a method of determining a trajectory for the rotorcraft as described above.

The above-described object is further solved by a computing system with at least one computing device and at least one processor, wherein the at least one computing device is configured to execute on the at least one processor a method of determining a trajectory for a rotorcraft as described above.

In an exemplary realization, a new noise indicator of population exposure to rotorcraft noise is determined and embedded in an optimization process. This noise indicator can be based on any noise metric (instantaneous or time-integrated), denoted L hereinafter. Preferably, background noise is considered in the optimization process by determining rotorcraft noise emergence above such background noise. As an example, emergence levels can be used as the considered noise metric L in the following. A minimal ($L_{min}$) and a maximal ($L_{max}$) value of interest for the considered noise metric are chosen. Several intervals (m) of values of L are then defined as follows:

$$\forall k \in \{1, \ldots, m\}, \underline{L_k} \leq L \leq \overline{L_k}$$

$$\forall k \in \{1, \ldots, m-1\}, \overline{L_k} = \underline{L_{k+1}}$$

$$\underline{L_1} = L_{min}, \overline{L_m} = L_{max}.$$

A respective number of people forming the population on ground in each interval of the considered noise metric is counted and denoted Pk. An increasing weighting $\alpha_k$ is applied to each interval of the noise metric, considering that the higher the value of the noise metric, the more noise annoyance is implied. The noise indicator finally aggregates the weighted number of people in each interval according to the formula below:

$$f = \sum_{k=1}^{m} \alpha_k * p_k$$

$$\forall k \in \{1, \ldots, m-1\}, \alpha_k < \alpha_{k+1}.$$

Advantageously, this noise indicator may be embedded as cost function to be minimized in an algorithmic scheme, which aims at computing noise-reduced, i.e., noise-minimized rotorcraft trajectories. This may be achieved by coupling of a local optimizer to a noise footprint computation software.

More specifically, at each iteration the local optimizer determines a new rotorcraft trajectory, for which the environmental impact assessment is performed through the noise footprint computation software. The values of the previously described cost function and the constraints are calculated and fed again into the local optimizer. The local optimizer is adapted to determine rotorcraft trajectories with guaranteed local optimality. As the optimization method is local, an appropriate initial starting point is computed through an auxiliary path planning problem. In this auxiliary path planning problem, the noise is not considered directly in the cost function: the goal is to minimize both travelled distance and population overflown.

Advantageously, a respective history of recent past flights over a given area may be considered. In fact, in case of huge rotorcraft traffic keeping flying the same noise-reduced, i.e., noise-minimized trajectory over the given area may be detrimental to community acceptance. Therefore, it may be advisable to distribute or spread rotorcraft traffic in the given area on multiple alternative rotorcraft trajectories in order to improve fairness for the population on ground. These alternative rotorcraft trajectories are defined by the algorithmic scheme described above. In other words, instead of considering real population data, the latter is updated/weighted according to the respective history of past and, in particular, recent past flights in the given area.

Besides the determination of noise-reduced, i.e., noise-minimized rotorcraft trajectories, a noise indicator may be embedded in the avionics of a given rotorcraft, which may be based on any kind of noise metric. This noise indicator may be used to inform the pilot of the rotorcraft's current "noise performance".

More particularly, the noise indicator may combine both the population impacted by the current rotorcraft's noise emission and the level of background noise as defined above. The noise indicator of the rotorcraft is preferably determined in real-time during rotorcraft operation. According to e.g., the value of the noise indicator, a signal may be indicated, e.g., displayed to the pilot, to inform him that the operating condition of the rotorcraft is (too) noisy. Then, the pilot may choose (or not) to apply some SNRS that will be coupled to the AFCS (e.g., a reduced noise reduction law).

BRIEF DESCRIPTION OF THE DRAWINGS

Preferred embodiments are outlined by way of example in the following description with reference to the attached drawings. In these attached drawings, identical or identically functioning components and elements are labelled with identical reference numbers and characters and are, consequently, only described once in the following description.

DETAILED DESCRIPTION

Figure 1A:
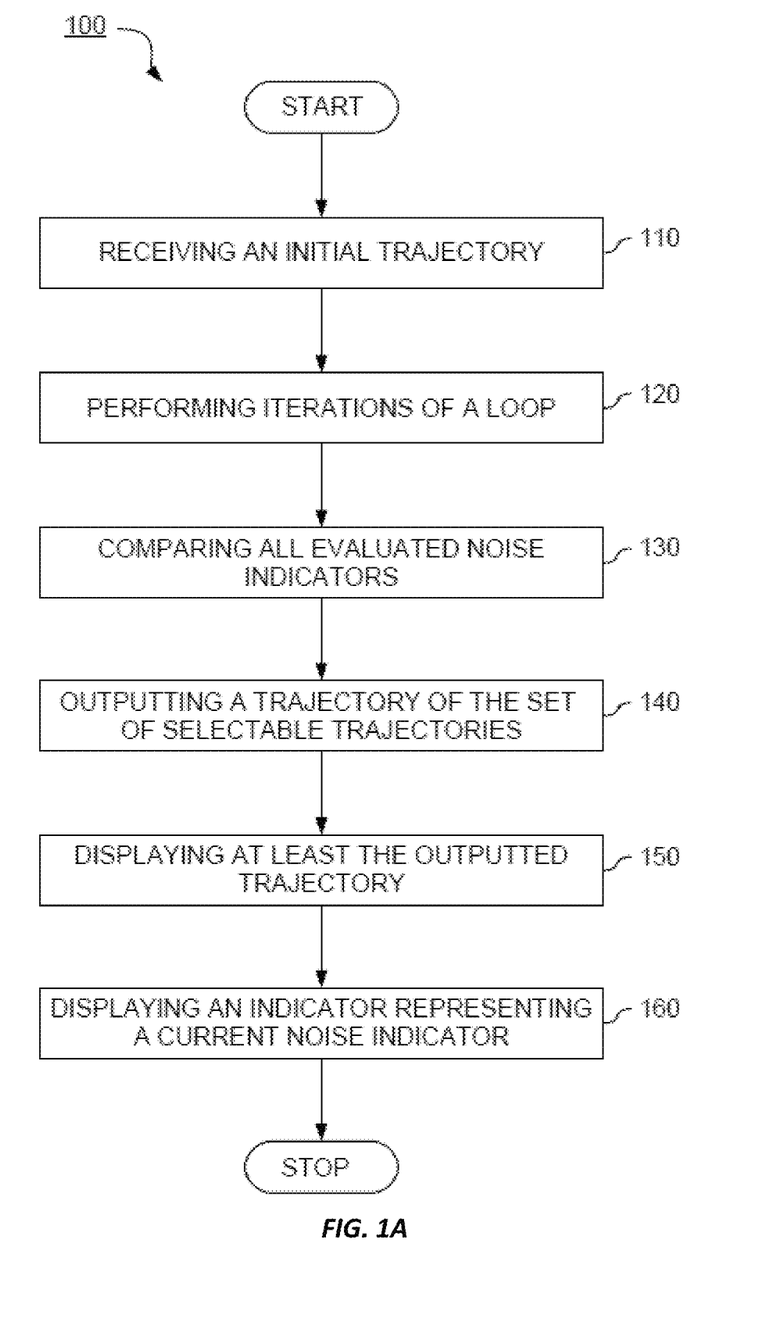
FIG. 1A and FIG. 1B show flow diagrams of the inventive method of determining a trajectory for a rotorcraft.
Figure 1B:
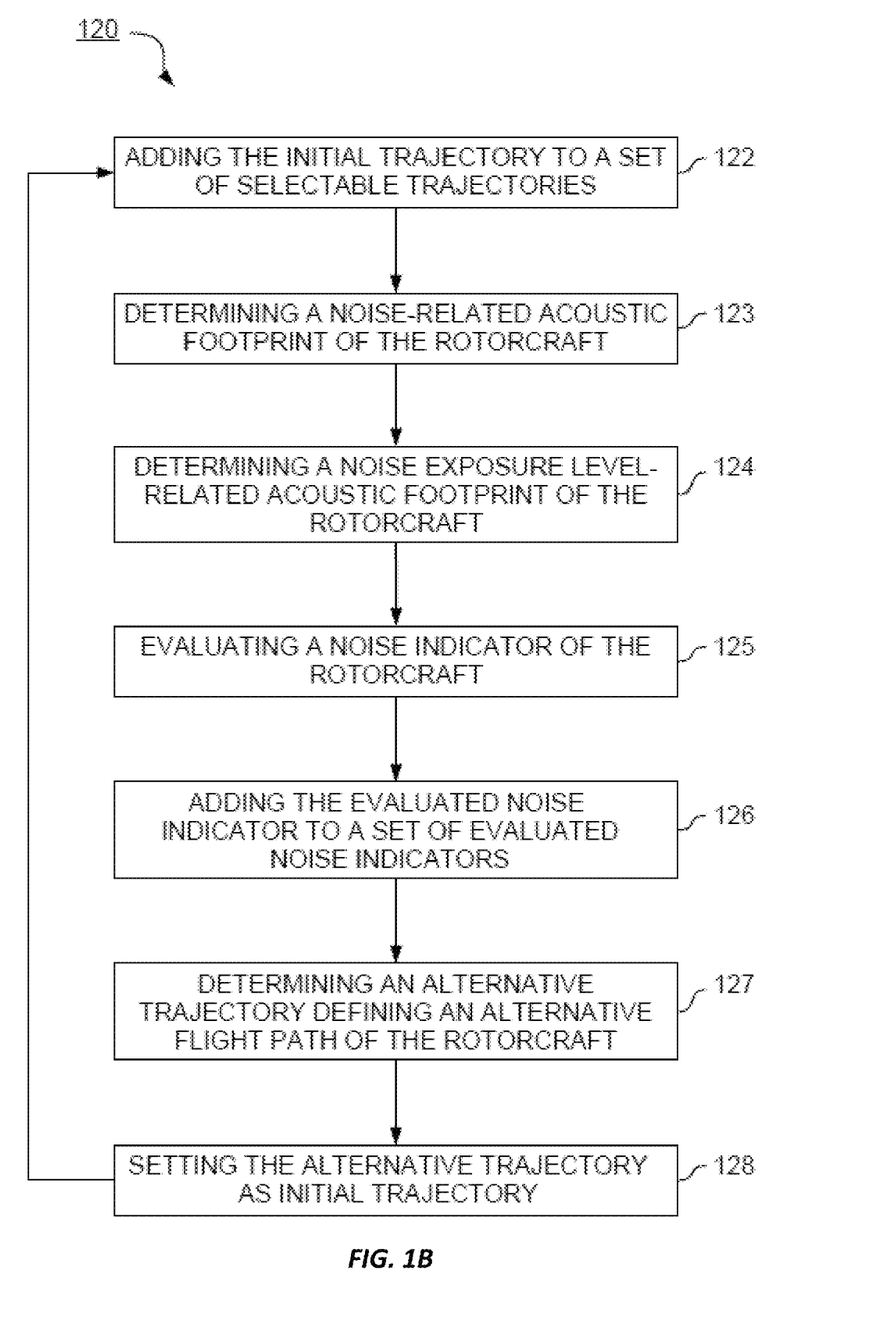

FIG. 1A and FIG. 1B show a method 100 of determining a trajectory for a rotorcraft (e.g., 800 in FIG. 8) according to the present disclosure. The method 100 starts at step 110 with receiving an initial trajectory defining a planned flight path (e.g., 315 in FIG. 3) of the rotorcraft between a starting point (e.g., 510 in FIG. 5) and a target point (e.g., 520 in FIG. 5). The starting point may be associated with a takeoff position of the rotorcraft in a respective operating area (e.g., 405 in FIG. 4), or with a current position of the rotorcraft in the respective operating area.

Preferably, the planned flight path is determined by a path planning algorithm (e.g., 310 in FIG. 3) which aims to provide the initial trajectory as a cost-reduced, preferentially cost-minimized, rotorcraft trajectory, e.g., with respect to an underlying travelling distance, without particularly considering rotorcraft noise issues. However, the planned flight path may be determined such that a respective population on ground which is to be overflown by the rotorcraft is preferably minimized. In other words, the planned flight path may be determined by minimizing a weighted function that accounts for both travelling distance and population overflown.

The path planning algorithm may be implemented by any suitable path planning algorithm which may even be a conventional well-known path planning algorithm. For instance, the path planning algorithm may be a Fast Marching Tree used to compute the initial trajectory defining the planned flight path, using the starting point and the target point.

The initial trajectory may be defined as a three-dimensional path using appropriate coordinates. However, the initial trajectory may in addition be defined using e.g., associated rotorcraft operating parameters, such as rotorcraft speed and so on.

At step 120, a loop is entered and iterations of the loop are performed to improve and, preferably, optimize the initial trajectory. Each iteration of the loop starts at step 122 with adding the initial trajectory to a set of selectable trajectories.

At step 123, a noise-related acoustic footprint of the rotorcraft is determined for the initial trajectory. For instance, determining the noise-related acoustic footprint of the rotorcraft for the initial trajectory may comprise computing a noise metric defining rotorcraft noise emergence above background noise.

More specifically, computing a noise metric defining rotorcraft noise emergence above background noise may comprise selecting a minimum value of interest $L_{min}$ for the noise metric, and selecting a maximum value of interest $L_{max}$ for the noise metric. Then, a predetermined number m of intervals of values of interest may be determined according to:

$$\forall k \in \{1, \ldots, m\}, \underline{L_k} \leq \overline{L} \leq \overline{L_k}$$

$$\forall k \in \{1, \ldots, m-1\}, \overline{L_k} = \underline{L_{k+1}}$$

$$\underline{L_1} = L_{min}, \overline{L_m} = L_{max}.$$

In addition, a noise exposure level-related acoustic footprint of the rotorcraft is determined for the initial trajectory at step 124. For instance, determining the noise exposure level-related acoustic footprint of the rotorcraft for the initial trajectory may comprise computing population exposure to rotorcraft noise on the initial trajectory.

More specifically, computing the population exposure to rotorcraft noise on the initial trajectory may comprise determining a plurality of waypoints on the initial trajectory, and determining a number of people forming the population on the plurality of waypoints. The number of people forming the population on the plurality of waypoints may e.g., be determined using suitable demographic data. The suitable demographic data is preferably pre-processed, e.g., to be included in a graphical representation (e.g., 400 in FIG. 4) that may be displayed to the pilot of the rotorcraft as described below at FIG. 4.

Then, the noise-related acoustic footprint of the rotorcraft at the plurality of waypoints is determined. The determination of the noise-related acoustic footprint of the rotorcraft at the plurality of waypoints is preferably derived from the noise-related acoustic footprint of the rotorcraft for the initial trajectory determined as described above at step 123.

Thus, an associated noise exposure for the plurality of waypoints may be computed. The associated noise exposure for the plurality of waypoints preferably relates at the plurality of waypoints the noise-related acoustic footprint of the rotorcraft to the number of people forming the population.

More specifically, determining the noise exposure level-related acoustic footprint of the rotorcraft for the initial trajectory at step 124 may comprise counting a number of people pk subjected to rotorcraft noise in each interval k of the predetermined number m of intervals of values of interest.

Moreover, determining the noise exposure level-related acoustic footprint of the rotorcraft for the initial trajectory at step 124 may further comprise determining a number of previous flights during a predetermined time interval. More specifically, the previous flights, or past flights, are preferably determined in an operating area of the rotorcraft, in which the initial trajectory is located (e.g., operating area 405 of FIG. 4). Thus, weighing of the noise exposure level-related acoustic footprint on the basis of a cumulated noise exposure level-related acoustic footprint of the determined number of previous flights is enabled.

Then, at step 125 a noise indicator of the rotorcraft for the initial trajectory is evaluated on the basis of the noise-related acoustic footprint and the noise exposure level-related acoustic footprint. Preferably, the noise indicator f for an associated noise exposure in each interval of values of interest of the predetermined number m of intervals of values of interest is determined according to:

$$f = \sum_{k=1}^{m} \alpha_k * p_k$$

$$\forall k \in \{1, \ldots, m-1\}, \alpha_k < \alpha_{k+1},$$

wherein $\alpha_k$ is an applied weighting factor forming a noise annoyance factor associated with each interval k of the predetermined number m of intervals of values of interest. The evaluated noise indicator is added at step 126 to a set of evaluated noise indicators.

At step 127, an alternative trajectory defining an alternative flight path of the rotorcraft between the starting point and the target point is determined on the basis of the determined noise indicator. At step 128, the alternative trajectory is set as initial trajectory.

Determining the alternative trajectory of the rotorcraft may further comprise considering operational constraints of the rotorcraft. For instance, a respective maximum rotorcraft speed, an applicable ascending level, an applicable descending level, acceptability of a respective ascending/descending level to passengers, and so on, may be considered.

Then, the loop consisting of steps 122 to 128 may be reiterated, i.e., performed one or more further times. Accordingly, in total a minimum of at least two different trajectories is determined and added to the set of selectable trajectories.

Preferably, the loop consisting of steps 122 to 128 is reiterated as long as the respectively associated determined noise indicator improves, i.e., as long as a noise level associated with the determined noise indicator decreases. However, reiteration of the loop consisting of steps 122 to 128 may be stopped if the determined noise indicator degrades, i.e., if the noise level associated with the determined noise indicator increases. More particularly, reiteration of the loop consisting of steps 122 to 128 may be stopped if the noise level associated with the determined noise indicator increases for a predetermined number of successive times.

More particularly, reiteration of the loop consisting of steps 122 to 128 may be stopped if the respectively associated determined noise indicator degrades over a predetermined number of reiterations of the loop. In other words, if the noise level associated with the respectively associated determined noise indicator does no more decrease in the predetermined number of reiterations of the loop, the loop consisting of steps 122 to 128 is preferably stopped. The predetermined number may e.g., be 10.

After having exited the loop consisting of steps 122 to 128, the method 100 continues at step 130, where all evaluated noise indicators in the set of evaluated noise indicators are compared to determine a selected noise indicator that fulfills predetermined noise indicator conditions. Preferably, the selected noise indicator that fulfills predetermined noise indicator conditions is the noise indicator with the lowest associated noise level.

At step 140, a trajectory of the set of selectable trajectories that is associated with the selected noise indicator is outputted. For instance, at least the outputted trajectory may be displayed at step 150 on a display device in the rotorcraft to the pilot. Alternatively, or in addition, the outputted trajectory may be provided to a flight management system of the rotorcraft. Furthermore, an indicator representing a current noise indicator may be displayed at step 160 on a display device in the rotorcraft to the pilot.

Preferably, the method 100 is continuously performed in flight operation of the rotorcraft to continuously adjust the initial trajectory. Alternatively, the method 100 may be performed repeatedly, i.e., at predetermined time intervals to enable a punctual adjustment of the initial trajectory.

Figure 2:
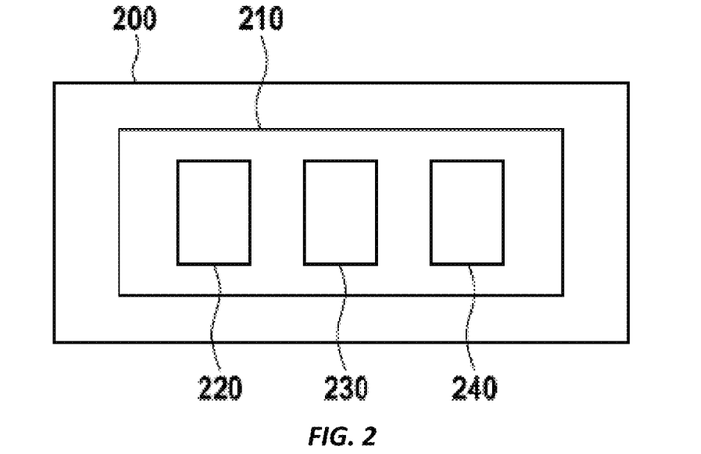
FIG. 2 shows a schematic view of an illustrative flight management system that is configured to implement the inventive method of FIG. 1.

FIG. 2 shows a flight management system 200 of a rotorcraft that is configured to implement the method 100 of FIG. 1A and FIG. 1B for determining a trajectory for the rotorcraft. Illustratively, the flight management system 200 comprises a computing system 210 with at least one computing device 220 and at least one processor 230, wherein the at least one computing device 220 is configured to execute on the at least one processor 230 the method 100. However, it should be noted that the computing system 210 may also be implemented independent of the flight management system 200.

By way of example, the computing system 210 comprises at least one storage 240. Thus, the method 100 of FIG. 1A and FIG. 1B may be implemented as a computer program product (e.g., 305 in FIG. 3) stored in the at least one storage 240.

Figure 3:
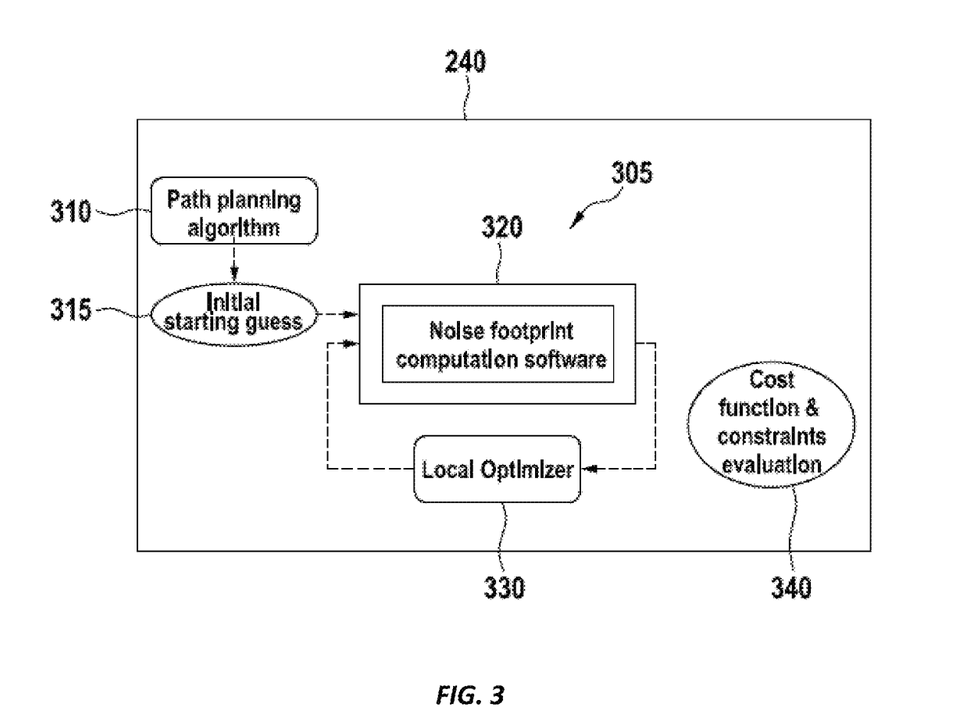
FIG. 3 shows a schematic view of a storage of the illustrative flight management system of FIG. 2.

FIG. 3 shows the storage 240 of FIG. 2 with an illustrative computer program product 305, i.e., respective computer-readable instructions. By way of example, the computer program product 305 comprises a path planning algorithm module 310 which determines the initial trajectory, which is also referred to as initial starting guess 315, received at step 110 of the method 100 of FIG. 1A and FIG. 1B. The computer program product 305 further comprises a noise footprint computation software module 320, a local optimizer module 330, and a cost function and constraints evaluation module 340 for implementing the method 100 of FIG. 1A and FIG. 1B.

For instance, the noise footprint computation software module 320 may implement the steps 122 to 125 of the method 100 of FIG. 1A and FIG. 1B, and the local optimizer module 330 may implement the steps 126 to 160 of the method 100 of FIG. 1A and FIG. 1B. The cost function and constraints evaluation module 340 in turn may e.g., be used by the local optimizer module 330 in determination of alternative rotorcraft trajectories.

Figure 4:
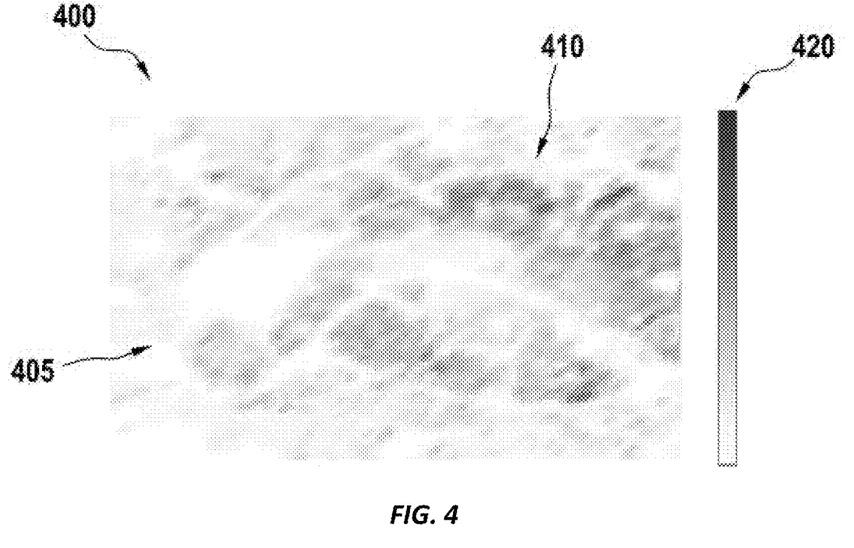
FIG. 4 shows an illustrative operating area of a rotorcraft.

FIG. 4 shows a graphical representation 400 of a given population density in an illustrative rotorcraft operating area 405. More specifically, the given population density is illustrated by means of plotted demographic data 410 according to an associated population density scale 420. As indicated by the population density scale 420, the population in the illustrative rotorcraft operating area 405 is denser the darker the illustrative rotorcraft operating area 405 is represented.

Figure 5:
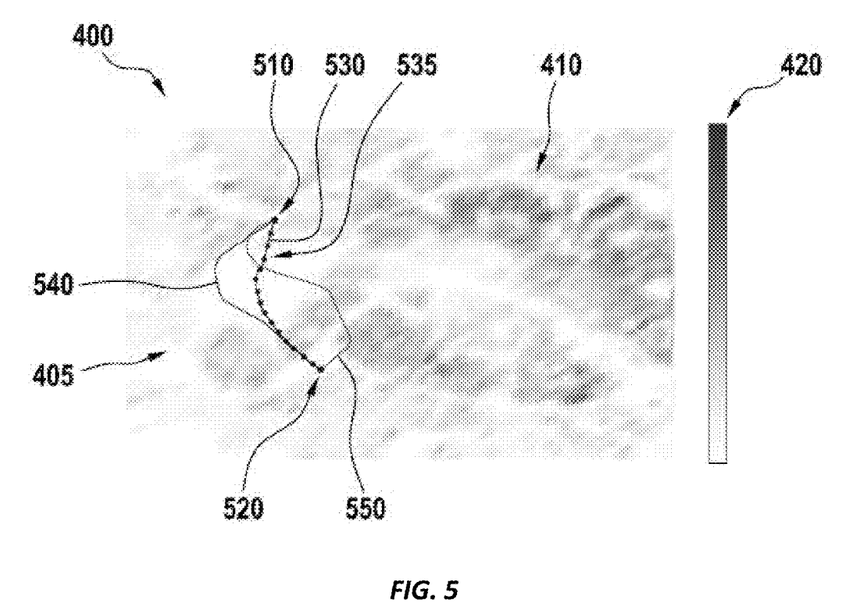
FIG. 5 shows the illustrative operating area of FIG. 4 with a plurality of possible rotorcraft trajectories.
Figure 6:
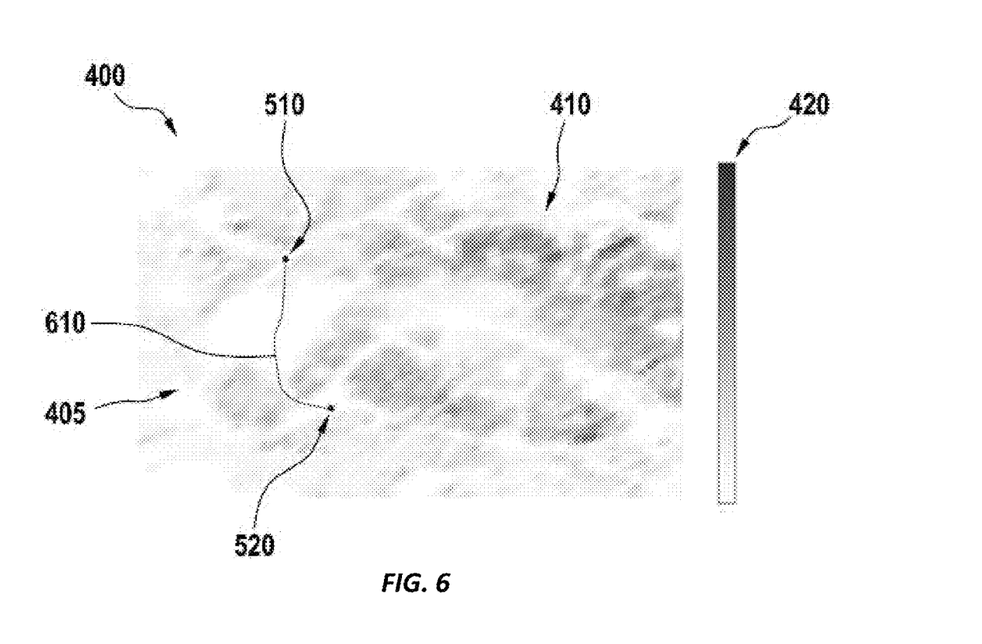
FIG. 6 shows the illustrative operating area of FIG. 4 with a finally selected rotorcraft trajectory.

FIG. 5 and FIG. 6 show an illustrative execution of the method 100 of FIG. 1A and FIG. 1B for determining a trajectory for a rotorcraft in the rotorcraft operating area 405 of FIG. 4 between an illustrative starting point 510 and an illustrative target point 520. As described above, the method 100 of FIG. 1A and FIG. 1B starts at step 110 with receiving an initial trajectory 530. For instance, the initial trajectory 530 forms the initial starting guess 315 in FIG. 3.

Then, one or more alternative trajectories are determined as described above. For instance, a first alternative trajectory 540 may be determined by means of a first iteration of the loop consisting of steps 122 to 128 of the method 100 of FIG. 1A and FIG. 1B and, subsequently, a second alternative trajectory 550 is determined.

Each one of the trajectories 530, 540, 550 preferably comprises a plurality of waypoints. However, for simplicity and clarity of the drawing only the initial trajectory 530 is illustrated with a plurality of waypoints 535.

Assuming that each one of the alternative trajectories 540, 550 has an improved noise indicator compared to the previously received/determined trajectory 530, 540, respectively, execution of the loop consisting of steps 122 to 128 of the method 100 of FIG. 1A and FIG. 1B is reiterated each time. Assuming further that execution of the loop consisting of steps 122 to 128 of the method 100 of FIG. 1A and FIG. 1B does not provide any further improvement after determination of a trajectory 610 shown in FIG. 6, execution of the loop is stopped as described above and the trajectory 610 is outputted at step 140 of the method 100 of FIG. 1A and FIG. 1B.

Figure 7:
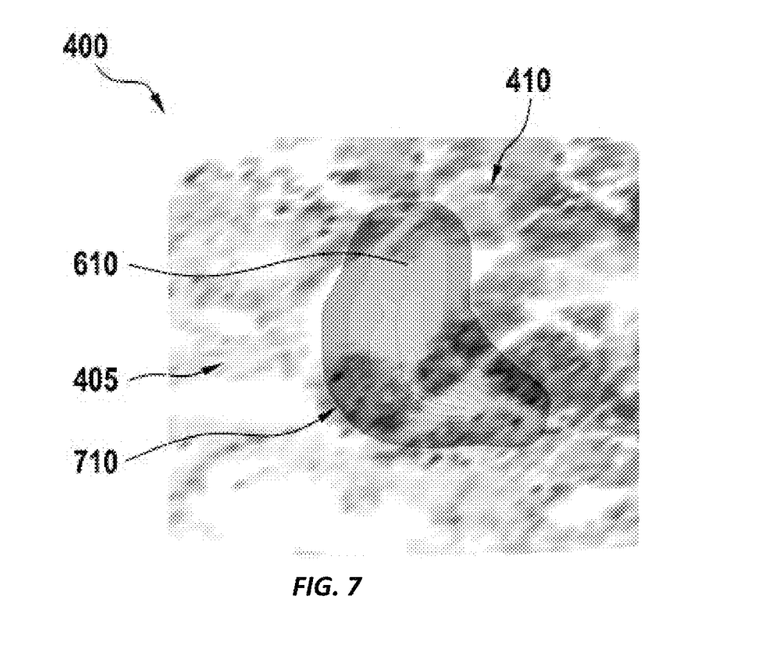
FIG. 7 shows an illustrative noise contour associated with the finally selected rotorcraft trajectory.

FIG. 7 shows an illustrative noise contour 710 associated with the outputted trajectory 610 of FIG. 6. The noise contour 710 forms the basis of the noise indicator of the outputted trajectory 610 which is evaluated according to step 125 of the method 100 of FIG. 1A and FIG. 1B.

Figure 8:
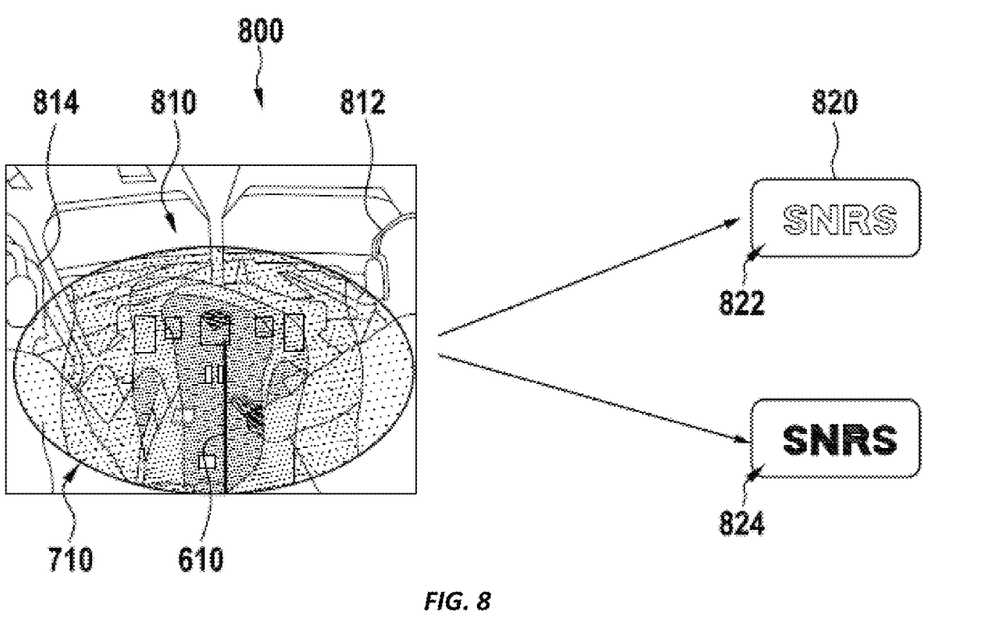
FIG. 8 shows an illustrative noise indicator.

FIG. 8 shows an illustrative rotorcraft 800 with a cockpit 810. By way of example, a pilot 812 and a co-pilot 814 are shown in the cockpit 810.

According to one aspect, the noise contour 710 of FIG. 7 with the outputted trajectory 610 of FIG. 7 may be displayed to the pilot 812 and/or the co-pilot 814. This may be done using a suitable display device in the cockpit 810 and is, only for purposes of illustration, represented in an exaggerated manner in FIG. 8.

Dependent on a respective advancement, i.e., positioning of the rotorcraft 800 on, and relative to, the outputted trajectory 610, an activation of SNRS may, nevertheless, be required to achieve a noise-optimized travel. Therefore, a suitable SNRS requirement indicator 820 may be provided in the cockpit 810, which may e.g., be illuminated in a first color 822, such as white, to indicate that SNRS activation is advisable, and in a second color 824, such as green, to indicate that SNRS activation is not required, or vice versa.

It should be noted that modifications to the above described configurations are within the common knowledge of the person skilled in the art and, thus, also considered as being part of the present disclosure. For instance, the method 100 of FIG. 1A and FIG. 1B is illustrated and described above as a sequence of steps. However, this sequence of steps is only shown for purposes of illustration and not for limiting the present disclosure to the illustrated and described sequence. Instead, various steps may be interchanged with other steps or combined with each other, and so on. By way of example, the step 122 may arbitrarily be performed at any time in the loop consisting of steps 122 to 128 as long as it is performed prior to step 128. Furthermore, the steps 123, 124 may be combined or performed in parallel instead of being performed one after another, and so on.

Moreover, the method 100 of FIG. 1A and FIG. 1B may be performed only once, e.g., prior to departure of the rotorcraft, to determine an optimized rotorcraft trajectory. However, it may also be performed repeatedly or continuously in order to guarantee that the rotorcraft is always travelling on an optimized trajectory.

Furthermore, determination of an optimized trajectory does not necessarily need to be performed in the rotorcraft, but may e.g., also be performed on any other suitable premises. In this case, the optimized trajectory may simply be transmitted to the rotorcraft in flight operation, and so on.

REFERENCE LIST 100 method
110-160 method steps
200 flight management system
210 system
220 computing device
230 processor
240 storage
305 computer program product
310 path planning algorithm
315 planned flight path
320 noise footprint computation software module
330 local optimizer module
340 cost function and constraints evaluation module
400 graphical representation of population density
405 rotorcraft operating area
410 plotted demographic data
420 population density scale
510 starting point
520 target point
530 initial trajectory
535 plurality of waypoints
540 first alternative trajectory
550 second alternative trajectory
610 outputted rotorcraft trajectory
710 noise contour
800 rotorcraft
810 cockpit
812 rotorcraft pilot
814 rotorcraft co-pilot
820 SNRS requirement indicator
822 SNRS activation
824 SNRS deactivation

What is claimed is:

1. A method of determining a trajectory for a rotorcraft, comprising:
receiving an initial trajectory defining a planned flight path of the rotorcraft between a starting point and a target point;
performing iterations of a loop comprising:
adding the initial trajectory to a set of selectable trajectories,
determining a noise-related acoustic footprint of the rotorcraft for the initial trajectory,
determining a noise exposure level-related acoustic footprint of the rotorcraft for the initial trajectory,
evaluating a noise indicator of the rotorcraft for the initial trajectory on the basis of the noise-related acoustic footprint and the noise exposure level-related acoustic footprint,
adding the evaluated noise indicator to a set of evaluated noise indicators,
determining an alternative trajectory defining an alternative flight path of the rotorcraft between the starting point and the target point on the basis of the evaluated noise indicator, and
setting the alternative trajectory as initial trajectory;
comparing all evaluated noise indicators in the set of evaluated noise indicators to determine a selected noise indicator that fulfills predetermined noise indicator conditions; and
outputting a trajectory of the set of selectable trajectories that is associated with the selected noise indicator.

2. The method of claim 1, wherein at least two iterations of the loop are performed.

3. The method of claim 1, wherein receiving an initial trajectory defining a planned flight path of the rotorcraft between a starting point and a target point comprises:
using a path planning algorithm, in particular a Fast Marching Tree, to compute the initial trajectory using the starting point and the target point.

4. The method of claim 1, wherein determining a noise-related acoustic footprint of the rotorcraft for the initial trajectory comprises:
computing a noise metric defining rotorcraft noise emergence above background noise.

5. The method of claim 4, wherein computing a noise metric defining rotorcraft noise emergence above background noise comprises:
selecting a minimum value of interest $L_{min}$ for the noise metric;
selecting a maximum value of interest $L_{max}$ for the noise metric; and
determining a predetermined number m of intervals of values of interest according to:

$$\forall k \in \{1,\ldots,m\}, \underline{L_k} \leq \overline{L} \leq \overline{L_k}$$

$$\forall k \in \{1,\ldots,m-1\}, \overline{L_k} = \underline{L_{k+1}}$$

$$\underline{L_1} = L_{min}, \overline{L_m} = L_{max}.$$

6. The method of claim 1, wherein determining a noise exposure level-related acoustic footprint of the rotorcraft for the initial trajectory comprises:
computing population exposure to rotorcraft noise on the initial trajectory.

7. The method of claim 6, wherein computing population exposure to rotorcraft noise on the initial trajectory comprises:
determining a plurality of waypoints on the initial trajectory;
determining a number of people forming the population on the plurality of waypoints;
determining the noise-related acoustic footprint of the rotorcraft at the plurality of waypoints; and
computing an associated noise exposure for the plurality of waypoints that relates at the plurality of waypoints the noise-related acoustic footprint of the rotorcraft to the number of people forming the population.

8. The method of claim 5, wherein determining a noise exposure level-related acoustic footprint of the rotorcraft for the initial trajectory comprises:
counting a number of people pk subjected to rotorcraft noise in each interval k of the predetermined number m of intervals of values of interest; and
wherein evaluating a noise indicator of the rotorcraft for the initial trajectory on the basis of the noise-related acoustic footprint and the noise exposure level-related acoustic footprint comprises:

determining a noise indicator f for an associated noise exposure in each interval of values of interest of the predetermined number m of intervals of values of interest according to:

$$f = \sum_{k=1}^{m} \alpha_k * p_k$$

$$\forall k \in \{1, \ldots, m-1\}, \alpha_k < \alpha_{k+1},$$

wherein $\alpha_k$ is an applied weighting factor forming a noise annoyance factor associated with each interval k of the predetermined number m of intervals of values of interest.

9. The method of claim 1, wherein determining a noise exposure level-related acoustic footprint of the rotorcraft comprises:

determining a number of previous flights during a predetermined time interval; and weighing the noise exposure level-related acoustic footprint on the basis of a cumulated noise exposure level-related acoustic footprint of the determined number of previous flights.

10. The method of claim 1, wherein the starting point indicates a current position of the rotorcraft.

11. The method of claim 10, which is repeatedly performed in flight operation of the rotorcraft to adjust the initial trajectory.

12. The method of claim 1, further comprising:
displaying at least the outputted trajectory on a display device in the rotorcraft to the pilot.

13. The method of claim 1, further comprising:
displaying an indicator representing a current noise indicator on a display device in the rotorcraft to the pilot.

14. A flight management system in a rotorcraft that is configured to implement a method of determining a trajectory for the rotorcraft according to claim 1.

15. A computing system with at least one computing device and at least one processor, wherein the at least one computing device is configured to execute on the at least one processor a method of determining a trajectory for a rotorcraft according to claim 1.

* * * * *